July 4, 1950
J. E. BURTON
2,513,993
PANEL HEATING
Filed July 13, 1946
2 Sheets-Sheet 1
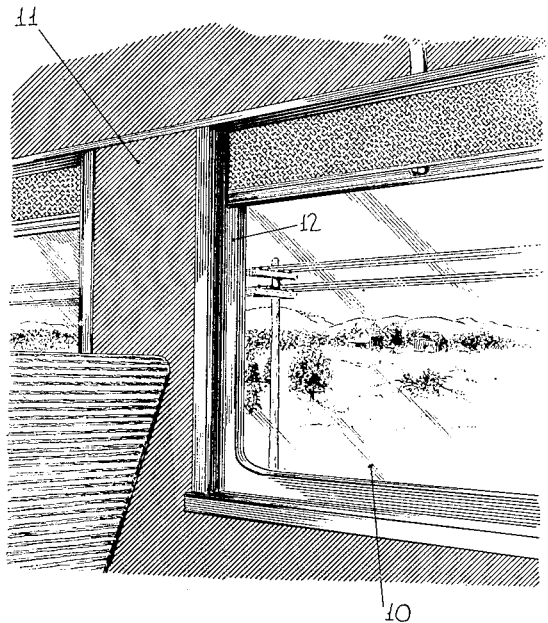
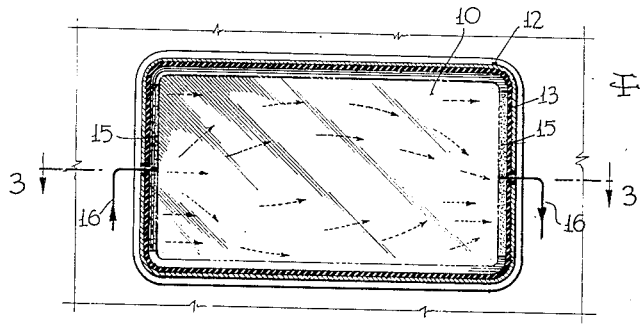
INVENTOR
BY John E. Burton
ATTORNEY

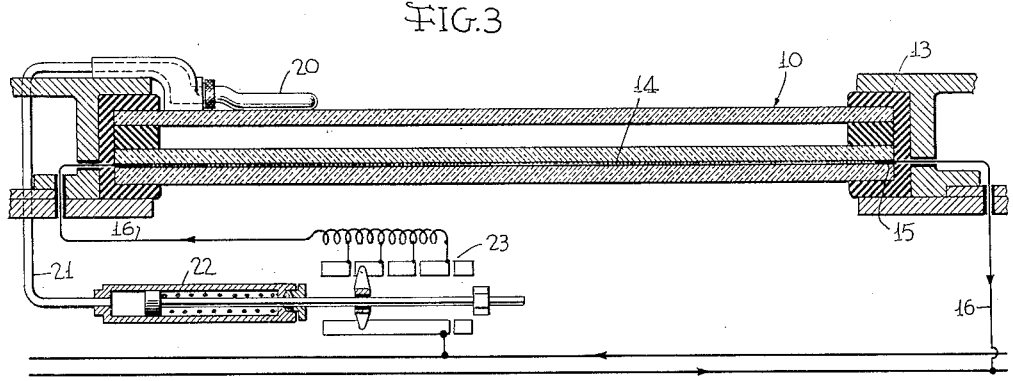
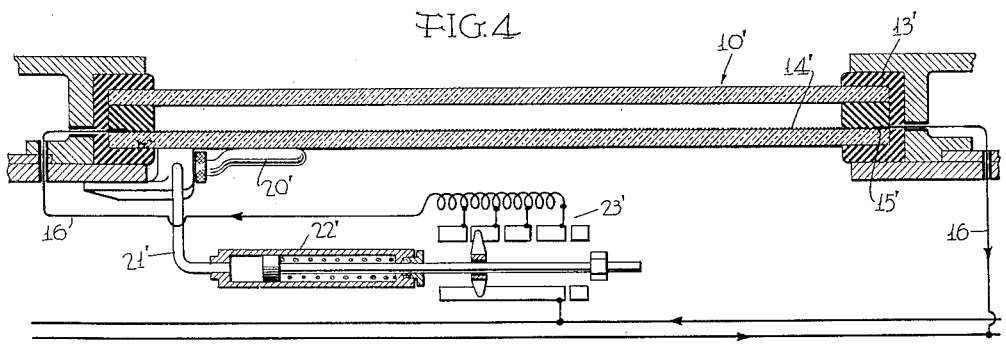
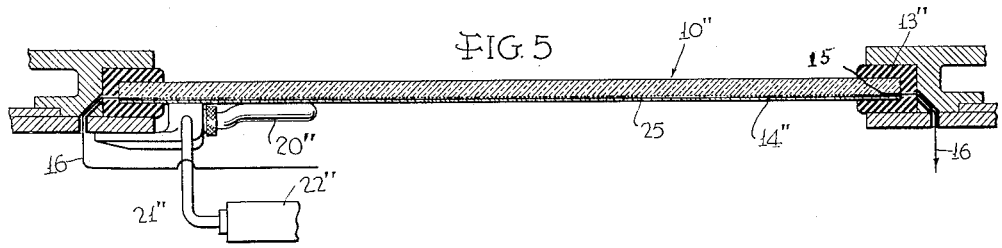

Patented July 4, 1950

2,513,993

UNITED STATES PATENT OFFICE 2,513,993

PANEL HEATING

John E. Burton, Philadelphia, Pa., assignor to The Budd Company, Philadelphia, Pa., a corporation of Pennsylvania Application July 13, 1946, Serial No. 683,571

7 Claims. (Cl. 219—19)

This invention relates to closure heating means, particularly to means for minimizing, commonly during cold weather, the heat exchange between objects, such as for example, an article or occupant within a compartment or enclosure, and a cold, commonly transparent, surface, particularly of windows, doors, and other closures of the compartment, and has for an object the provision of improvements in this art. The invention is particularly applicable to compartments or enclosures, such as for example, those of air, land and water transportation vehicles, buildings, and the like. Heretofore, it has been proposed to heat transparent closure elements, such as windshields of vehicles and the like, but only to such degree as to prevent fogging or icing of such elements; but no one has taken into consideration the comfort of occupants or the safety of objects, which by necessity, are often located adjacent glass closures and the like.

One of the primary objects of the present invention is to provide body comfort for occupants near windows and other transparent closures of compartments during cold weather. It is a common experience of occupants sitting near glazed windows, doors, and other closures in railway cars, buses, dwellings and the like, that an uncomfortable chill is felt on the side nearest the closure even when the prevailing air temperature within the compartment is within a body comfort range. The usual heating means provided during cold weather has furnished little or no relief for this situation. Indeed, the air temperature within the compartment, according to the usual heating practice, may be chilled on the side nearest the window or other closure, particularly in vehicles of transportation where a passenger, by necessity, is located adjacent a transparent window or the like.

Another object of the invention is to bring the inside surface of a glazed window, door, or other closure when outside temperatures are below body comfort temperatures, to such temperature that there will be substantially no perceptible heat transfer from the body to the closure. The body then will be as comfortable near the closure as when near the other walls of the compartment.

It has been determined that the average effective skin surface comfort temperature, with respect to radiant heat exchange, is approximately 80° F. It is therefore a further object of the present invention to provide a temperature of the inside surface of the window pane or other closure as near as practicable to that which under the prevailing outside temperatures will give maximum body comfort. It has been found that there is a temperature range, depending upon humidity conditions, etc., which makes the body feel comfortable, this range being about 75 to 90° F., and that no extreme discomfort is experienced within a temperature range of the adjacent inside closure surface of about 60 to 105° F.

Another object is to provide a heating medium for closures which is located as close as possible to that surface which is adjacent the object or occupant of the compartment or enclosure. To this end, the means for heating the closure is provided nearer the occupant side of the closure than the outside thereof. The heating means for the closure is of a type which will provide for a substantially uniform temperature over the entire surface inasmuch as this will provide for the best condition for preventing heat losses through the panel. Furthermore, when the closure is transparent or translucent the heating means will also be transparent, translucent or concealed so as not to alter the appearance of the closure or in the case of transparent closures, the transparency of the closure. This includes all connections which may be used with the heating means.

Another object is to provide temperature responsive means for controlling the amount of energy input to the heating means for the closure such as will tend to maintain the temperature approximating, at least, that which will tend to provide for body comfort.

The above and other objects of the invention will be apparent from the following description of exemplary embodiments thereof, reference being made to the accompanying drawings, wherein:

Fig. 1 is a side elevation of a portion of a wall of a passenger vehicle having a transparent closure which is heated in accordance with the present invention;

Fig. 2 is a vertical sectional view of a transparent closure alone showing one embodiment in the form of a transparent resistance film and also showing the electrical leads thereto;

Fig. 3 is a horizontal section through the closure of Fig. 2, which is of the double-panel or pane type, the section being taken approximately on the line 3—3 of Fig. 2, and the inner panel or pane being of the multi-laminae or du-plate type, the view also showing outside controls which are not visible in Figs. 1 and 2;

Fig. 4 is a section similar to Fig. 3, but in which the innermost panel, that is, the one which is adjacent the interior of the enclosure is in the form of a single pane, and in which the control is responsive directly to inside surface temperatures of the closures; and Fig. 5 is a similar section through a third embodiment in which the closure is a single laminated pane window, the inside lamina being much thinner than the other and serving principally for electrical insulation and covering for the resistance film.

In all the illustrated embodiments of the invention, I utilize a transparent, metallic, electrically conductive film associated with the closure panel or window of glass or other transparent or translucent material, for heating the same. However, heating of the panel may be attained in other manners, such as for example, by fine resistance wires associated with the panel, by electrically conductive material within the panel itself and forming part of the structure thereof, by di-electric methods or by any other suitable type which will maintain the closure panel at the temperatures contemplated by the present invention, insofar as some phases of the invention are concerned. It is not intended that the closure itself will constitute a main source of heat supply for the enclosure or occupants thereof but that it will act independently to supplement the principal heating means provided for the enclosure and that its heating effect will be regulated in such manner that its surface temperature will be adequate to prevent substantial heat losses from the occupant or article through the closure. Transparent heating means, such as metallic or other electrically conductive films, are available which present substantially no reduction in transparency of the single or multi-panels described herein.

The transparent closure 10, here shown as employed in a railway car 11, is carried by a frame 12, commonly of metal, and is insulated and protected from injury by insulating material 13, such as the weather-seal and shock-absorbing rubber strips commonly used around the entire periphery of the closure panes.

The transparent closure panel or panels may be made of any suitable material, such as glass or plastic, and may be laminated or of single thickness. Fig. 3 illustrates a multi-panel window with the inner panel laminated and the heating element, which is a transparent conductive film, carried between the laminae of such inner panel. The heating element is nearer the occupant side than the outside of the railway car or other compartment or enclosure and is spaced inwardly from the outer panel. Fig. 4 illustrates a multi-panel window in which the panels are not laminated and the heating element is located on the outer surface of the inner panel and, as in Fig. 3, is on a panel face which is nearer the passenger than the outermost face of the closure. In both Figs. 3 and 4, there is a highly effective insulating air or vacuum space between the inner panel and the outer panel intervening between the heating film and the outer panel of the window. Fig. 5 illustrates a transparent closure with a single panel with transparent conductive heating film on the panel face which is nearest the occupant of the enclosure, and with a thin protective lamina covering the heating element.

There may be various other arrangements but the examples chosen show effective arrangements which are sufficient to demonstrate the principles of the invention.

The heating element, shown in Fig. 3 as a resistance film of any suitable transparent, electrically conductive material uniformly distributed over substantially the entire surface of the inner pane is designated by the numeral 14. At suitable locations, as for example on opposite sides and for the full height or length of the inner panel, there are provided feeder buses 15 which are in intimate contact with or integral with the conductive film 14 and these buses are connected to insulated conductors 16 by which they are placed in an electrical circuit to be later described. Both the buses and conductors are concealed by the frame. If necessary, other and differently located buses may be provided to obtain desired uniform electrical current distribution. The buses 15 with the resistance film selected for illustration may be a thicker deposit of metal film or may be thin metal strips secured on the film and in good electrical contact therewith throughout their length.

Means are provided for controlling the heat exchanged by the heat exchange element, here the heating element, for the closure in accordance with the temperature of the closure. In Fig. 3 the control means is shown as comprising a temperature responsive element, such as for example, an expansive fluid bulb 20, which is placed against the outside surface of the outer panel where it will be affected by the temperatures prevailing on this outside surface. When thus placed directly against the panel surface, it is responsive to panel surface temperatures even if the panel is coated on the outside surface with ice and the outside air temperature may be, such as during a sleet storm, higher than the actual temperature of the outer surface thereof. The temperature responsive element 20 is also indirectly responsive to inside temperatures, inasmuch as the fixed characteristics of the window establish a predetermined heat gradient loss between the inside and outside which is taken into account.

Through a tube 21, fluid in the element 20 is maintained in communication with an expansible fluid device 22 which operates a control rheostat 23 to control the current flow to the heating element 14 through the conductors 16.

The form of the temperature responsive control selected for illustration is one which lends itself to ready understanding in drawings, but it is to be understood that various other well known and available devices may be used. The control means are concealed or protected from occupants of the compartment or so nearly so as to be inconspicuous.

In Fig. 4, a temperature responsive element 20', responsive to temperatures inside the enclosure is employed. This element is closely adjacent and preferably in contact with that surface of the inner pane of the window which is located at the interior of the enclosure. This provides direct regulation in response to temperatures of this interior surface.

In Fig. 4, the parts which correspond to parts in Fig. 3 are designated by the same reference characters with a prime (') suffix. Here again it is seen that the heating element 14' is placed nearer the inside of the enclosure than the outside and with an air space between it and the outer panel of the window to provide the greatest possible amount of thermal insulation on the outer side of the heating element. The light-transparent metallic film, when placed on the outer surface of a glass pane as shown in Fig. 4, has the property of inhibiting the emission from the outer surface of the pane of radiant heat rays tending to pass from the inside to the outside of the enclosure, whether at the time it is acting as a heating element or not.

In Fig. 5, the same reference characters are used with a double prime ('') suffix. Here again, the heating element 14'' of the single pane 10'' is placed nearer the inside of the enclosure than the outside, it being on the inner face of the pane and preferably covered by a thin transparent layer of insulating material 25 which will prevent shocks in the case of body contact with the pane. The temperature responsive element 20'' is immediately adjacent the inner face of the pane.

Normally, the particular degree of heat which is to be produced is maintained at that surface of the closure means, whether it be of the single or multi-panel type, which is adjacent the interior of the compartment or enclosure from which there is likely to be a transfer of heat to the closure from an occupant or object within the enclosure. However, the present invention includes any and all arrangements or types of heat exchange devices or elements which will provide for the maintenance of such temperatures at the interior surfaces of closures of compartments as will insure body comfort.

While heating films and resistance elements have been mentioned, it is to be understood that the heating element may be incorporated in the pane itself or in the space between panes. Also while control of individual closures is referred to, it is possible to control a plurality of closures from a typical one of them.

In any or all of the embodiments, means may be provided for minimizing the loss of heat by radiation toward the outside of the panel. Such means may be in the character of panel used. For example, the type of glass known as "Solex" has been found to give considerable aid against radiation losses when placed outwardly with reference to the heating element. This does not detract from transparency.

Specific embodiments of the invention have been described to illustrate its principles but it is to be understood that there may be various embodiments within the limits of the prior art and the scope of the subjoined claims.

What is claimed is:

1. In an enclosure having in the principal heat insulated walls an opening, and light-transparent closure means in said opening, means in addition to and independent of the principal heating means for the enclosure for heating the surface of the closure means substantially uniformly over the surface adjacent the interior of the enclosure, said heating means comprising electrically heated means associated with said surface in such manner as not to impair the transparency of said closure means, a source of electric current connected with said heating means, control means operatively connected with said source and said heating means, and temperature responsive means associated with said closure means and said control means and located at an external surface of the closure means for controlling the supply of current to said heating means in accordance with temperatures existing at a surface of said closure means.

2. In an enclosure having in the principal heat insulated walls an opening, and light transparent closure means in said opening, means in addition to and independent of the principal heating means for the enclosure for heating the surface of the closure means substantially uniformly over the surface adjacent the interior of the enclosure, said heating means comprising a very thin transparent electrically heated film distributed over said surface in such manner as not to impair the transparency of said closure means, a source of electric current connected with said heating means, control means operatively connected with said source and said heating means, temperature responsive means associated with said closure means and said control means and located at an external surface of the closure means for controlling the supply of current to said heating means, and transparent electric insulating means covering said heating means for insulating said heating means from the interior of the enclosure.

3. In an enclosure having in the principal heat insulated walls an opening, and a pair of light-transparent panels forming a closure for said opening and having a substantially dead air space between panels, means in addition to and independent of the principal heating means for the enclosure for minimizing the transfer of heat from the interior of the enclosure through said closure panels to the exterior comprising heating means associated with that surface of the inner panel which is adjacent the interior of the enclosure, said heating means being such as not to impair the transparency of the panels and to substantially uniformly heat the entire surface area of the inner panel, a source of electric current for said heating means, and temperature-responsive control means associated with said heating means and said source and located at the exterior surface of the outer said panel, for controlling the supply of current to said heating means, said control means being effective at exterior temperatures below the temperature within the enclosure to maintain the surface of the inner panel which is adjacent the interior of the enclosure at such temperature as will insure against substantial heat losses through the panels from an occupant located within the enclosure and adjacent said panels.

4. Thermal exchange means for a compartment, comprising in combination, a light-transparent closure in a wall of said compartment, said closure having less resistance to the outward passage of radiant heat rays than the walls of the compartment, thermal exchange means for said closure, and means located at and responsive to the temperature of one of the external, outdoor or indoor, surfaces of said closure for controlling said thermal exchange means for maintaining the temperature of that surface of the closure which faces the interior of the compartment within a predetermined temperature range.

5. Thermal exchange means for a compartment, comprising in combination, a light-transparent closure panel in a wall of said compartment, said closure having less resistance to the outward passage of radiant heat rays than the walls of the compartment, thermal exchange means for said panel, and means responsive to the temperature of that surface of the panel which faces the interior of the compartment for controlling the temperature produced by said heating means.

6. In an enclosure having in the principal heat insulated walls an opening, and light-transparent closure means in said opening, means in addition to and independent of the principal heating means for the enclosure for heating the surface of the closure means substantially uniformly over the surface adjacent the interior of the enclosure, said heating means including a light-transparent electric current conducting film on the exterior surface of a light-transparent pane of said closure means, means for supplying current to said closure heating means, and means for controlling the current supply in accordance with the temperature of a surface of said closure means, the pane serving as a protection from said heating film for the occupants of the enclosure and the heating film in addition to supplying heat serving to inhibit the emergence of heat rays from the inside to the outside of the pane.

7. In an enclosure having in the principal heat insulated walls an opening, and light-transparent closure means in said opening, said closure means including spaced light-transparent panes with a sealed space between them, means in addition to and independent of the principal heating means for the enclosure for heating the surface of the closure means substantially uniformly over the surface adjacent the interior of the enclosure, said heating means including a light-transparent electric current conducting film on the exterior surface of the inner light-transparent pane of said closure means, means for supplying current to said closure heating means, and means for controlling the current supply in accordance with the temperature of a surface of said closure means, the pane serving as a protection from said heating film for the occupants of the enclosure and the heating film in addition to supplying heat serving to inhibit the emergence of heat rays from the inside to the outside of the pane.

JOHN E. BURTON.

REFERENCES CITED

The following references are of record in the file of this patent:

UNITED STATES PATENTS

| Number | Name | Date |
| --- | --- | --- |
| 863,211 | Paul | Aug. 13, 1907 |
| 2,006,006 | Zaiger | June 25, 1935 |
| 2,021,661 | Kisfaludy | Nov. 19, 1935 |
| 2,119,680 | Long | June 7, 1938 |
| 2,165,970 | Jaspers | July 11, 1939 |
| 2,382,340 | Smith | Aug. 14, 1945 |
| 2,429,420 | McMaster | Oct. 21, 1947 |
| 2,441,831 | Moore | May 18, 1948 |